United States Patent [19]

Valdes

[11] Patent Number: 4,488,738

[45] Date of Patent: Dec. 18, 1984

[54] SYNTHETIC PLASTIC PIPE COUPLING AND METHOD OF ASSEMBLY

[76] Inventor: Osvaldo J. Valdes, Alameda 4463, Santiago, Chile

[21] Appl. No.: 262,986

[22] Filed: May 12, 1981

[51] Int. Cl.³ .............................................. F16L 35/00
[52] U.S. Cl. ...................................... 285/40; 285/251; 285/423; 29/525
[58] Field of Search ................ 285/251, 40, 423, 390; 29/525

[56] References Cited

U.S. PATENT DOCUMENTS

| | | | |
|---|---|---|---|
| 91,291 | 6/1869 | Wegman | 285/40 |
| 158,259 | 12/1874 | Dulin | 285/40 |
| 635,636 | 10/1899 | Bailey | 285/40 |
| 2,125,570 | 8/1938 | Ice | 285/145 |
| 2,196,966 | 4/1940 | Hammer | 285/390 X |
| 2,448,747 | 9/1948 | Swain | 285/251 |
| 2,465,556 | 3/1949 | Taylor | 285/205 |
| 2,580,818 | 1/1952 | Mundy et al. | 285/6.5 |
| 2,845,106 | 7/1958 | Baker | 285/390 X |
| 3,266,821 | 8/1966 | Safford | 285/40 |
| 3,381,978 | 5/1968 | Faustini | 285/40 |
| 3,726,547 | 4/1973 | Cox | 285/423 X |
| 3,990,728 | 11/1976 | Coughlin | 285/40 |
| 4,018,462 | 4/1977 | Saka | 285/423 X |
| 4,079,966 | 3/1978 | Berry et al. | 285/24 |

FOREIGN PATENT DOCUMENTS

| | | |
|---|---|---|
| 2659269 | 6/1978 | Fed. Rep. of Germany . |
| 139631 | 1/1980 | Fed. Rep. of Germany ........ 285/40 |
| 873844 | 7/1941 | France . |
| 363389 | 1/1974 | Switzerland . |
| 633182 | 4/1948 | United Kingdom . |
| 1133125 | 11/1968 | United Kingdom ................ 285/40 |

Primary Examiner—Dave W. Arola
Attorney, Agent, or Firm—Stevens, Davis, Miller & Mosher

[57] ABSTRACT

A synthetic plastic pipe coupling comprising an internally threaded fitting of synthetic plastic material and a pipe of synthetic plastic material. The material of the fitting is harder than the material of the pipe so that the threads of the fitting act as a die for the creation of helical grooves on the pipe as the pipe is hand screwed into the fitting. The pipe is continued to be screwed passing the threaded portion of the fitting to a cylindrical portion adjacent to the threaded portion, which has a diameter not greater than the internal diameter of the threaded portion, so that the initial grooves are erased and the pipe is compressed to a lesser diameter for the purpose of creating a fluid tight contact zone operating hydraulically in favor of pressure and proportionately to it.

14 Claims, 5 Drawing Figures

SYNTHETIC PLASTIC PIPE COUPLING AND METHOD OF ASSEMBLY

This invention relates to a self-threaded fluid self-tight pipe coupling and a method by which it is assembled. More particularly, to a pipe coupling made from a synthetic plastic material in which the fitting is of a material harder than the material from which the pipe is made. The fitting has threads acting as a die for the helical or spiral grooving or threading of the pipe. The fitting also acts to remove the initial grooves of the pipe upon assembly, drawing the ungrooved end of the pipe into a cylindrical portion of diameter not greater than the internal diameter of the threads to create a fluid tight seal.

BACKGROUND OF THE INVENTION

Heretofore, threaded pipe couplings either of metals or synthetic plastic materials have required prethreading the pipe with an appropriate die tool, this being a disadvantage because a die tool is expensive and difficult to use. Another disadvantage to this type of coupling lies in the requirement that pipe caulk or similar material must be expertly employed to obtain a fluid tight seal.

Synthetic pipe couplings are also known in which an O-Ring, or a similar washer, and a gripping metal ring are factory assembled within the fitting to produce a self-supporting and fluid tight coupling. The disadvantage of this type of assembly is that the coupling cannot be disassembled.

Synthetic pipe couplings are also known in which the fitting is inserted inside the pipe. The assembly is secured by a metal ring compressed by a crimping tool.

This type of coupling has three disadvantages: first, the fitting's internal bores are smaller than the pipe interior diameter; second, the metal ring can easily corrode, and third, the crimping tool is too expensive for the occasional customer, especially in the do-it-yourself market.

Other synthetic plastic pipe couplings are also known in which the assembly is created by the concurrence of a sealing element and an incrustating metal ring, held to the fitting by a threaded nut.

This type of coupling has two disadvantages: first, they are very costly due to the multiple parts that compose the assembly, and second, they are too voluminous in relation to the pipe diameter, a notorious hindrance when employed within thin walls.

Some synthetic plastic pipes can be coupled through solvent welding. Such couplings cannot be disassembled and reused, and they cannot be repaired.

Some other synthetic plastic pipes can be fusion welded. This method required expensive tooling and great expertise, being restricted in its usage to a few specialized fields.

The invention overcomes the foregoing disadvantages of heretofore known couplings.

SUMMARY OF THE INVENTION

It therefore, is an object of this invention to provide a self-threading pipe coupling the assembly of which is done by hand alone without tools.

Another object of this invention is to provide a fluid self-tightening pipe coupling which does not require pipe caulk, O-Rings, or solvents.

A further object of this invention is to provide a low cost synthetic pipe coupling with no additional parts beside the fitting itself, which may be massively produced with code approved synthetic plastic materials, which may be easily understood and installed by anyone, and which requires no expertise to create a fully working assembly.

A still further object of this invention is to provide a plastic pipe coupling of small relative volume to be practically installed in thin walls.

A yet further object of this invention is to provide a plastic pipe coupling which may be disassembled and reused and which permits easy repair.

A final object of this invention is to provide a plastic pipe coupling which functions hydraulically with pressure, not against it, so that pressure increase creates a favorable effect.

BRIEF DESCRIPTION OF THE DRAWINGS

The present invention will be described in more detail with respect to the embodiments shown in the accompanying drawings given by way of nonlimiting example, in which equal or equivalent parts are marked by the same reference numerals and in which.

DETAILED DESCRIPTION OF THE DRAWINGS

Figure 1:
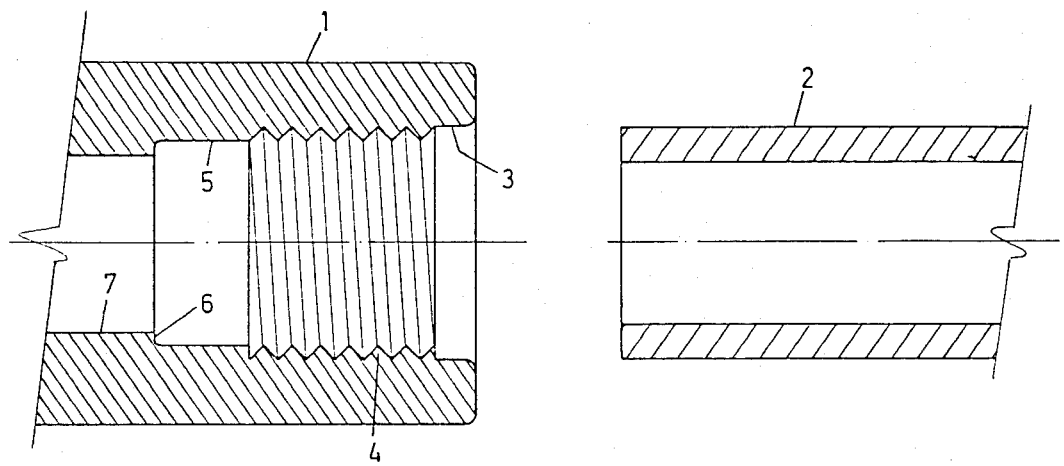
FIG. 1 shows the fitting and pipe prior to being coupled.

Referring to FIG. 1, there can be seen a fitting made of synthetic plastic material, e.g. polyacetal, nylon 6 or 66 or polypropylene, which must be of a harder material than the synthetic plastic material from which pipe 2 is made. The pipe may be made of polybutylene, polyethylene, polypropylene or polyvinyl chloride. Fitting 1 which may be of any fitting configuration for connecting pipe defines a cylindrical opening 3 of pipe diameter for guiding unthreaded pipe 2 into an internally threaded portion 4 which acts as a die for the inserted pipe 2. Extending beyond the threaded portion 4 is an internal diameter equal or less than the diameters of the apexes of the threads of threaded portion 4. The longitudinal length of the threaded portion 4 is longer than the longitudinal length of the cylindrical portion 5 so that upon insertion of the pipe there will be sufficient frictional contact between threads of the fitting and pipe to overcome the force required to remove the initially formed threads on the pipe. The cylindrical portion 5 ends at an annular shoulder 6 which further defines a bore 7 through the fitting.

Figure 2:
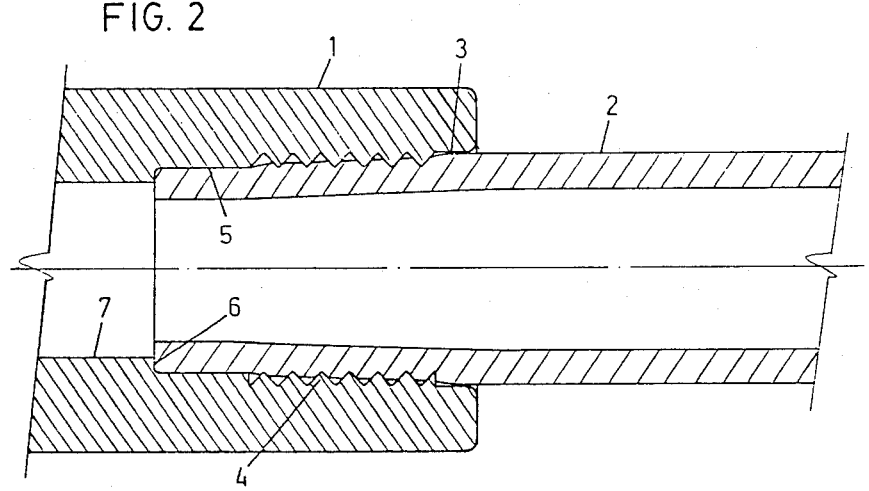
FIG. 2 shows the coupling of the invention.

Referring to FIG. 2, there can be seen a pipe section coupled, after it has been hand screwed into the fitting.

In assembling the pipe is screwed to the fitting by hand alone. Previous lubrication of the fitting threads makes the coupling easier.

The pipe upon insertion is drawn into the unthreaded cylindrical portion 5 where two important actions take place simultaneously. First, the helical grooves formed by threaded portion 4 are removed, and second, the pipe diameter diminishes engaging snuggly to said cylindrical portion 5.

Figure 3:
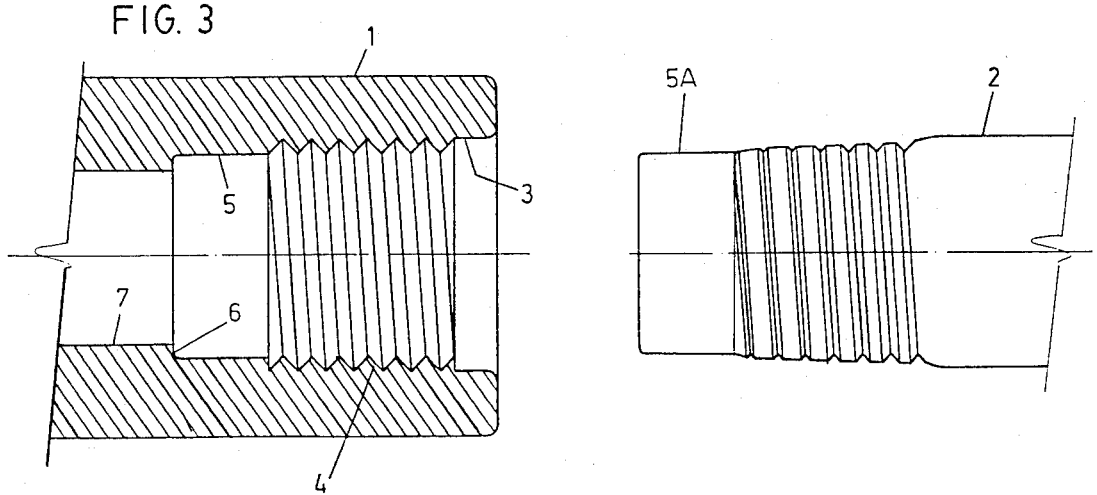
FIG. 3 shows the pipe removed from the fitting, after it has been coupled.

FIG. 3 shows the same pipe section after it has been disassembled. Cylindrical portion 5 produced in the pipe a diminished ungrooved diameter 5A.

The pipe can be coupled again, while the fitting may be reused several times until its threads wear out and can no longer groove the pipe.

Figure 4:
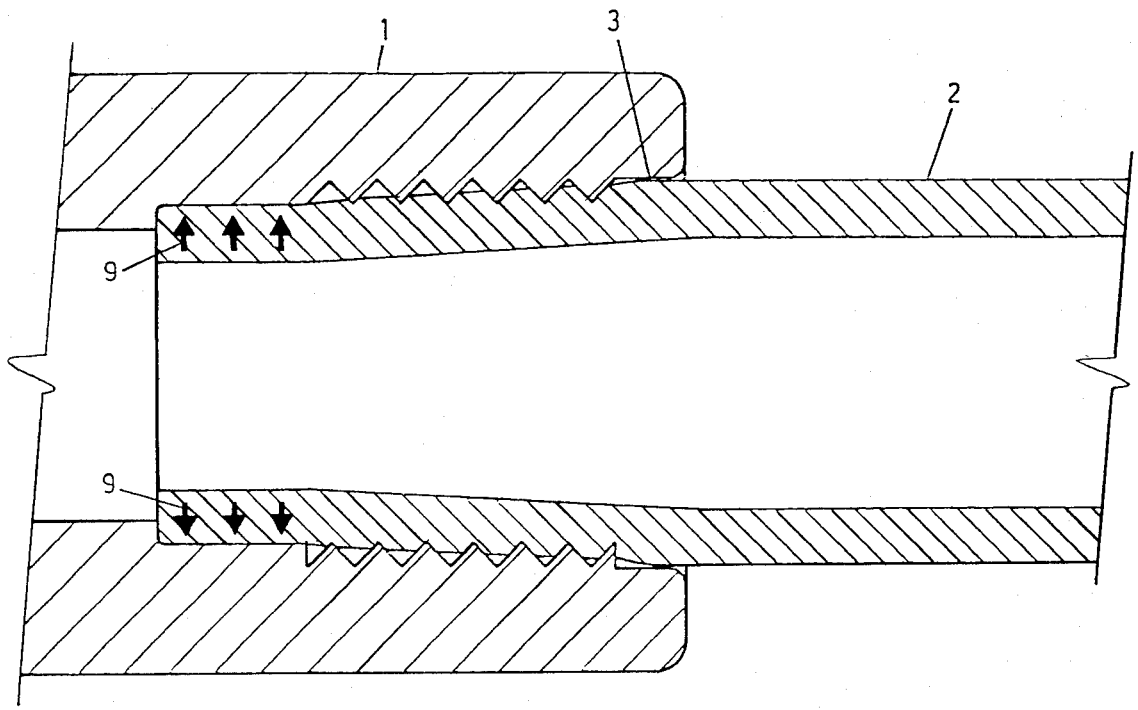
FIG. 4 shows the pipe compressed into the cylindrical portion of the fitting.

Referring to FIG. 4, there can be seen symbolically, marked by arrows 5, the fluid tight effect of compressed pipe on the cylindrical wall of the fitting.

Figure 5:
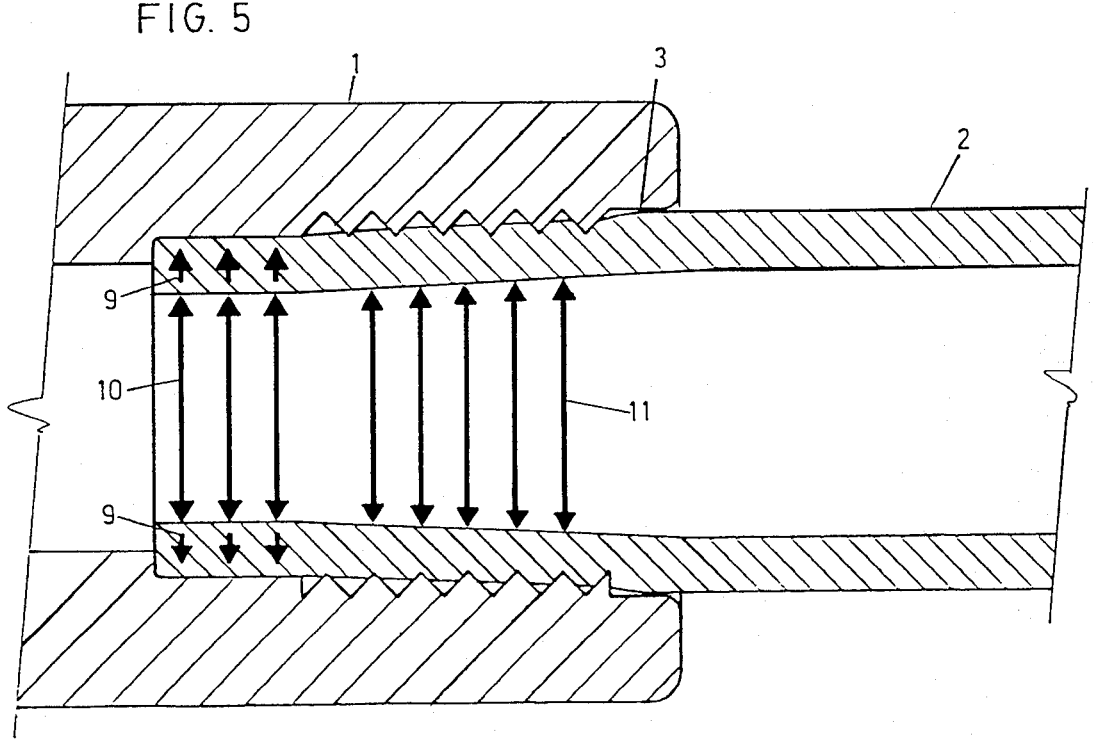
FIG. 5 shows the pipe compressed into the cylindrical portion of the fitting with internal fluid pressure.

With relation to FIG. 5, the same effect of fluid tightness described above is further increased by internal pressure, displayed by arrows 10.

Another hydraulical effect is described in FIG. 5 by arrows 11. The holding action of pipe grooves against fitting threads starts when the pipe is inserted into the fitting, and increases proportionately to internal fluid pressure as shown by arrows 11.

Actual testing of pipes made of diverse synthetic plastic materials coupled by polyacetal fittings have resulted unfailingly in pipe bursting before coupling damage or leakage.

What is claimed is:

1. A synthetic plastic pipe coupling consisting of an internally threaded fitting of synthetic plastic material and a pipe of synthetic plastic material having threaded and unthreaded portions within said fitting, said material of said fitting being harder than said material of said pipe so that said threads of said fitting create threads on the portions of said pipe within said fitting as the pipe is screwed into said fitting, said fitting defining an enlarged opening for directing said pipe into said fitting, an internally threaded portion adjacent said enlarged opening having grooves of said threads equal in diameter to the diameter of the enlarged opening, an internal unthreaded portion adjacent said threaded portion and an annular shoulder, said unthreaded portion terminating at said shoulder which defines a smaller inner bore of said fitting, said pipe defining an external unthreaded portion adjacent an end corresponding to said unthreaded portion of said fitting, said unthreaded portion of said pipe having had threads erased therefrom by said unthreaded portion of said fitting and an external threaded portion corresponding to said threaded portion of said fitting, said end of said pipe abutting said shoulder of said fitting.

2. The coupling of claim 1 wherein said unthreaded portion of said fitting is cylindrical in shape.

3. The coupling of claim 3 wherein the longitudinal length of said threaded portion of said fitting is greater than the longitudinal length of said cylindrical portion.

4. The coupling of claim 3 wherein the inner diameter of the lands of said threaded portion of said fitting is not less than the inner diameter of said cylindrical portion.

5. The coupling of claim 1 wherein the pipe is made from polybutylene.

6. The coupling of claim 1 wherein the pipe is made from polyethylene.

7. The coupling of claim 1 wherein the fitting is made of nylon.

8. The coupling of claim 1 wherein said threads created on said pipe at its extreme border are erased by the action of hand screwing said pipe into said fitting until seated against said shoulder.

9. The coupling of claim 8 wherein said cylindrical portion compresses the pipe to create a fluid tight assembly aided proportionately by internal pressure.

10. The coupling of claim 1 wherein said threaded portion of said fitting holds the pipe by said created threads from coming apart from said fitting aided proportionately by internal pressure.

11. The coupling of claims 1 or 8 wherein the longitudinal length of said threaded portion of said fitting is greater than the longitudinal length of said cylindrical portion so as to create a sufficient pull to draw said pipe into the said lesser diameter of said cylindrical portion to create said fluid tight assembly.

12. The coupling of claim 1 wherein the pipe is made of polybutylene, polyethylene, polypropylene or polyvinyl chloride.

13. The coupling of claim 1 wherein the fitting is made of polyacetal, nylon 6 or 66, or polypropylene.

14. A method for assembling a pipe coupling which comprises inserting an unthreaded synthetic plastic pipe into an internally threaded synthetic plastic fitting having a threaded portion and an unthreaded portion of a diameter not greater than the internal diameter of the lands of the threaded portion, said material of said fitting being harder than the material of said pipe, rotating said pipe to create threads on the exterior of said pipe and removing the first formed pipe threads from the pipe by said unthreaded portion as the pipe progresses into the unthreaded portion.

* * * * *